Jan. 11, 1927.
F. E. FLACK
1,613,988
POWDER DISTRIBUTING ATTACHMENT FOR WAGONS
Filed July 17, 1926   2 Sheets-Sheet 2
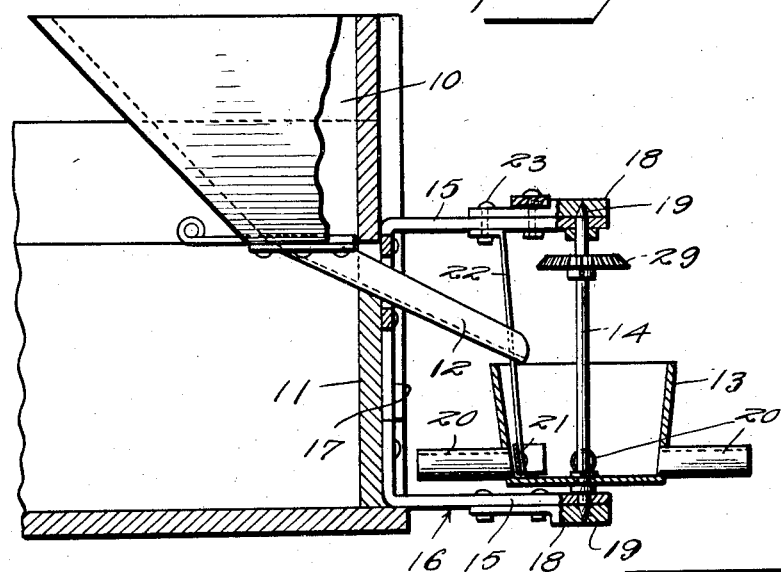
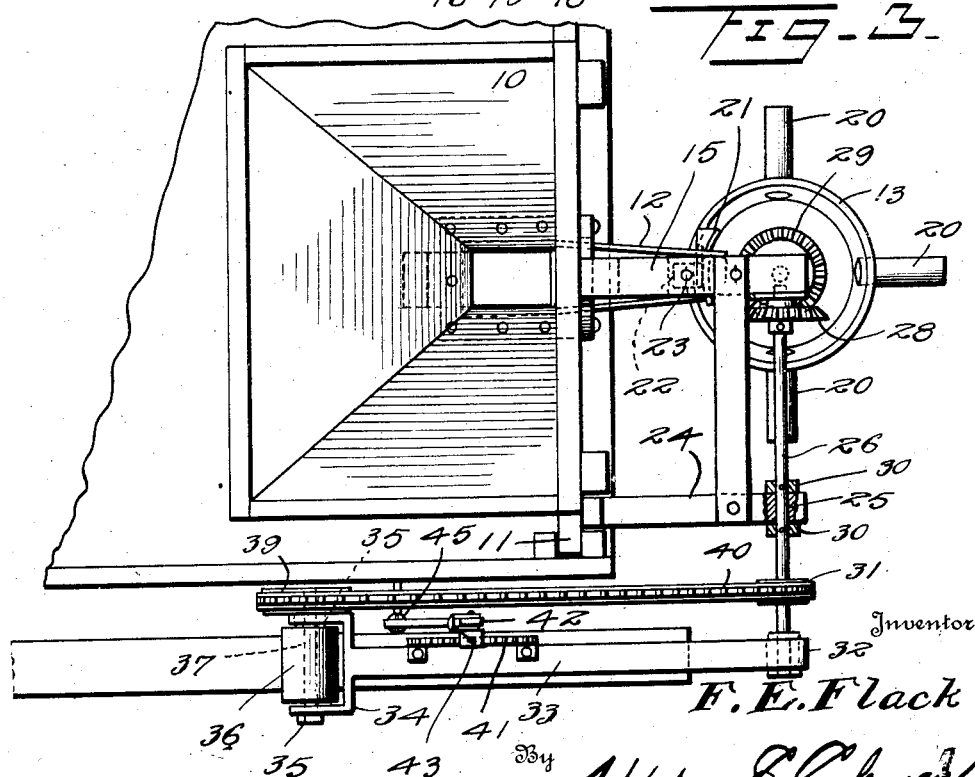
Inventor
F. E. Flack
By Watson E. Coleman
Attorney Patented Jan. 11, 1927.

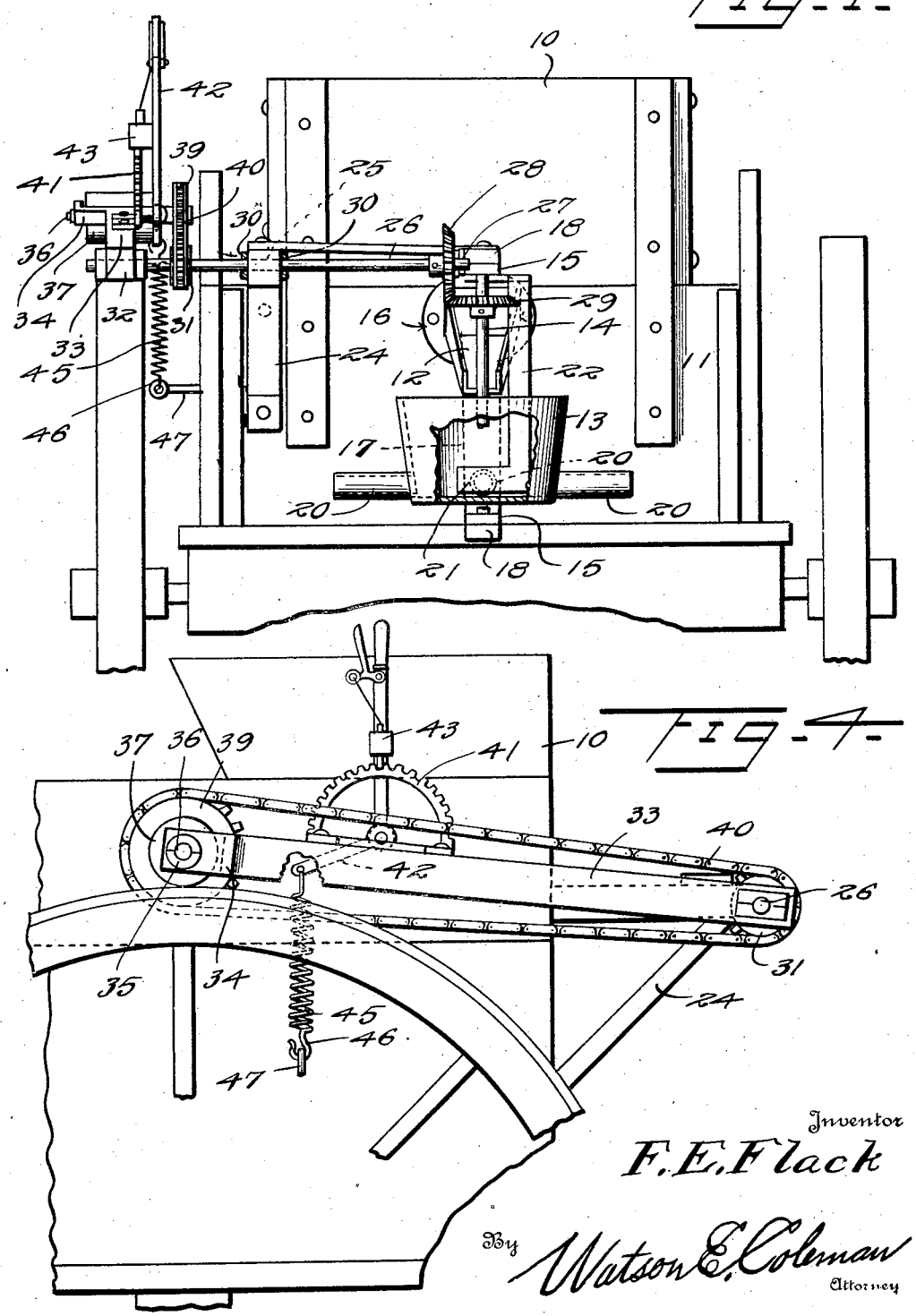

1,613,988

UNITED STATES PATENT OFFICE.

FRANKLIN E. FLACK, OF MENDON, ILLINOIS.

POWDER-DISTRIBUTING ATTACHMENT FOR WAGONS.

Application filed July 17, 1926. Serial No. 123,162.

This invention relates to powder distributing attachments for wagons and more particularly to a device for distributing lime or similar substances.

An important object of the invention is to provide a device of this character which is entirely supported from the tail gate of the wagon, so that it is immediately removed when it is desired to employ the wagon for any other purpose.

A further object of the invention is to provide a novel and efficient means for driving a device of this character from the wheel of the wagon of such construction that it will not interfere in any way with the removal of the tail gate from the wagon.

These and other objects I attain by the construction shown in the accompanying drawings, wherein for the purpose of illustration is shown a preferred embodiment of my invention and wherein:—

Figure 1 is a rear end elevation of a wagon having a powder distributing attachment constructed in accordance with my invention;

Figure 2 is a longitudinal sectional view therethrough;

Figure 3 is a plan view thereof;

Figure 4 is a side elevation thereof.

Referring now more particularly to the drawings, the numeral 10 indicates a hopper secured to the inner face of the tail gate 11 of the wagon and into which the contents of the wagon may be readily shoveled. This hopper has a discharge spout 12 projecting through the tail gate and its rear end discharging into a rotating distributing hopper 13. The distributing hopper 13 is secured to a vertical shaft 14, the ends of which are rotatably directed through the arms 15 of a U-shaped bracket 16, the bight portion 17 of which is bolted or otherwise secured to the rear face of the tail gate in a vertical position. Bolted to the outer faces of the arms 15 of the U-shaped bracket are bearing plates 18, each embodying a step bearing 19 in which an end of the shaft is engaged.

The distributing hopper 13 is substantially cup-shaped and has radiating from the side wall thereof adjacent the lower end of this wall a plurality of distributing spouts 20 through which the contents of the hopper may be thrown by centrifugal force, as the hopper is rotated. In order to prevent the contents of the hopper from being thrown from the arms, while these arms are directed toward the tail gate, a semi-circular baffle 21 is stationarily arranged within the hopper to close the mouths of these spouts at this time. In the present disclosure, the baffle 21 is shown as provided with an arm 22, the extremity of which is secured to the upper arm 15 of the U by one of the bolts 23 employed for securing thereto the associated bearing plate 18. The bracket 16 and its associated mechanism are located at the approximate center of the end gate and adjacent one side of the end gate a second bracket 24 is secured thereto and provided with a horizontally directed opening 25 forming a bearing or shaft 26. This shaft has its opposite end rotatably engaged within an opening 27 formed in the upper arm of the U-shaped bracket 16 and adjacent this arm has secured thereto a bevel gear 28. The bevel gear meshes with a second bevel gear 29 secured to the vertical shaft 14. The shaft 26 is suitably collared, as at 30, to prevent longitudinal shifting thereof.

The end of the shaft 26 projects beyond the bracket 24 and at the outer face of the bracket has secured thereto a sprocket gear 31. Beyond this sprocket gear 31, the shaft has rotatably engaged therewith the rear end 32 of an arm 33. The outer end of this arm is forked at 34 and the several branches thereof are formed with bearings 35 for a shaft 36 upon which, intermediate the arms, is secured a wheel engaging roller 37 for engagement with the rim of the wheel 38 of the wagon. One end of the shaft is projected beyond the branch of the fork through which it passes and has secured thereto a sprocket gear 39 aligning with the sprocket gear 31 and connected therewith by a chain 40. Upon the arm 33 is secured a segment 41 to which is pivoted a bell crank lever 42, one arm of which is provided with a latch mechanism 43 for coaction with the segment. The opposite arm 44 of this lever has secured thereto one end of a spring 45 the opposite end of which is in the form of a hook 46 for engagement in a suitable eye 47 which may be secured at any convenient point upon the wagon structure where the spring will be sufficiently tensioned to hold the roller 37 in proper engagement with the rim of the wheel 38.

In the use of the device, it is applied to a wagon by inserting the tail gate in the place normally occupied by the ordinary tail gate of the wagon. This application places the roller 37 in engagement with the rim of the wheel, but the spring 45 is connected with the eye 47 to insure an engagement such that a proper drive of the shafts 26 and 14 will be provided. As the wagon is driven over the ground, the contents of the wagon are shoveled into the hopper 10 and pass through the spout 11 to the distributing hopper 13 from which it is discharged by the spouts 20 during the rotation of the hopper. It will be quite obvious that while employing trained horses, the services of but one man will be necessary to both drive the team and replenish the hopper 10 since this hopper will require but infrequent attention.

Since the construction hereinbefore set forth is capable of a certain range of change and modification without materially departing from the spirit of the invention, I do not limit myself to such specific structure except as hereinafter claimed.

I claim:—

1. In combination with a fixed support, a bracket secured thereto, a vertically extending shaft rotatably mounted in the bracket, means for rotating said shaft, a container secured to the shaft and embodying radiating spouts through which the contents of the container are distributed by centrifugal force as the container is rotated and means for closing the inner ends of said spouts when the spouts are directed toward said fixed support.

2. In combination with a fixed support, a bracket secured thereto, a vertically extending shaft rotatably mounted in the bracket, means for rotating said shaft, a container secured to the shaft and embodying radiating spouts through which the contents of the container are distributed by centrifugal force as the container is rotated and means for closing the inner ends of said spouts when the spouts are directed toward said fixed support comprising a member secured to said bracket and extending into said container and there provided with an arcuately curved flange fitting the inner wall of the container.

3. In a distributor of the type described, in combination with a fixed support, a container supported for rotation thereon, means for rotating the container, a plurality of radiating spouts associated with the container for distributing material therefrom as the container is rotated, and means for closing the inner ends of said spouts when the spouts are directed towards said support.

4. In a distributor of the type described in combination with a fixed support, a container supported for rotation thereon, means for rotating the container, a plurality of radiating spouts associated with the container for distributing material therefrom as the container is rotated, and means for closing the inner ends of said spouts when the spouts are directed towards said support, comprising an arcuate member arranged within the container in the inner wall thereof and a supporting connection between said arcuate member and the fixed support.

In testimony whereof I hereunto affix my signature.

FRANKLIN E. FLACK.